UNITED STATES PATENT OFFICE.

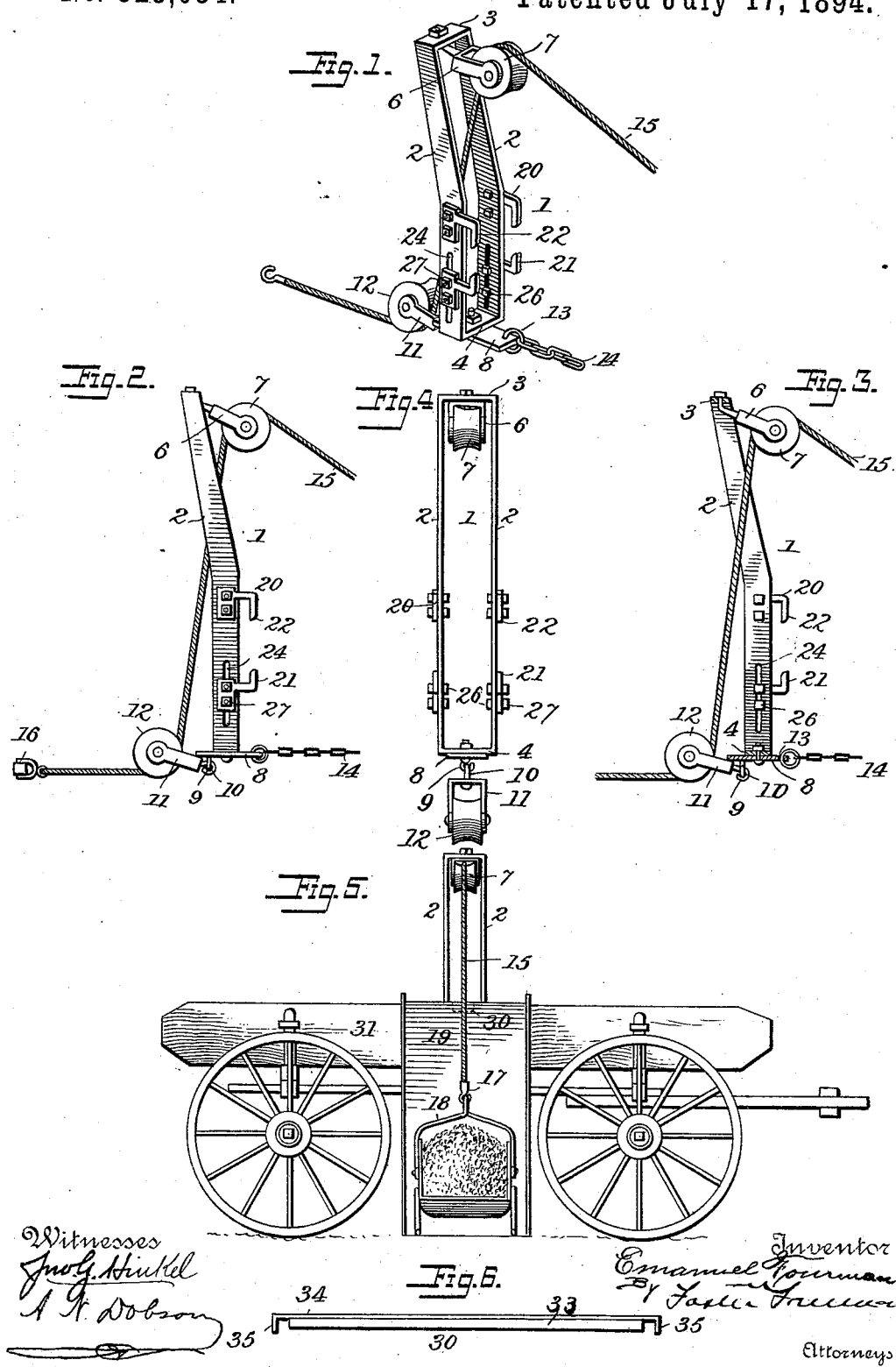

EMANUEL FOURMAN, OF ARCANUM, OHIO.

DIRT-LOADING MACHINE.

SPECIFICATION forming part of Letters Patent No. 523,034, dated July 17, 1894.

Application filed March 14, 1894. Serial No. 503,581. (No model.)

*To all whom it may concern:*

Be it known that I, EMANUEL FOURMAN, a citizen of the United States, residing at Arcanum, Darke county, State of Ohio, have invented certain new and useful Improvements in Dirt-Loading Machines, of which the following is a specification.

This invention relates to certain new and useful improvements in loading and unloading; and it consists substantially in such features of construction and arrangement, and combinations of parts as will hereinafter be more particularly described.

In the loading and unloading of bins, wagons, and vessels as at present practiced the appliances or machinery employed is frequently very complicated and cumbersome, and in a great many instances the operators of such devices are obliged to be specially instructed or trained in order to properly manipulate the same. Then again some of the machinery employed for the purposes named is extremely dangerous to the operator or attendant in charge, for frequently the breakage of a simple part will result in a very heavy load being precipitated below and scattered in many directions.

The object of the present invention is the loading and unloading of vessels or other receptacles with facility, and without the use of heavy or complicated appliances.

The invention also has for its object the loading and unloading of vessels or other suitable receptacles in a manner free from danger to the operator or attendant in charge.

The invention has for its still further object the loading and unloading of vessels or receptacles by the use of strong, easily operated and simple appliances, all as will more fully hereinafter appear when taken in connection with the accompanying drawings, wherein—

Figure 1, represents a view in perspective of my improved loading and unloading apparatus, and Fig. 2, is a side view thereof. Fig. 3, is a sectional elevation taken about centrally. Fig. 4, is a front elevation, and Fig. 5 is a side view of my improved loading and unloading device as applied to an ordinary wagon for conveying sand, gravel, or the like. Fig. 6 is a detail view of the cross-brace adopted when my device is employed upon a wagon.

Before proceeding with a more detailed description of parts, I desire to state that my invention is equally adapted to the loading and unloading of storage-bins of all kinds, the holds of vessels, and also to ordinary wagons or similar vehicles for the conveyance of sand, dirt, or gravel from the place of loading to the place or places of unloading.

If desired my invention may be only employed for loading, but in cases where a measured or given quantity only of material is to be unloaded at a time, or where portions of the material are to be left or dumped at different places, then my invention is useful for both the unloading as well as the loading of the material.

As the best example of the nature and operation of my improvements, I have shown the same in connection with an ordinary sand or gravel wagon, and I will now proceed to describe the several parts of the drawings by the several characters denoted thereon.

In the drawings 1, represents the main frame of my improved loading and unloading device or apparatus, the same being preferably constructed of wrought or malleable iron, and constituted of the side pieces 2, 2, and upper cross-piece 3, and lower cross piece 4. The said side-pieces 2, 2, are preferably inclined or set forward at 5, which furnishes a better or stronger leverage in the direction of the draft upon the elevating chain or rope, and the said frame is thereby braced or strengthened to sustain a much heavier load. Furthermore the said inclination given to the frame carries the upper part thereof outward from the support to which the said frame may be attached, and consequently it is not in the way of the operator; while the lower straight portions of the frame facilitate ready attachment to a support as will hereinafter appear.

Swung to the upper cross-piece 3, of the frame so as to extend rearward thereof at a slight inclination or angle, is a hanger or yoke 6, which carries a grooved wheel or pulley 7, while bolted or otherwise secured to the lower cross piece 4, of said frame 1, is an iron 8, having on its under side a loop 9, in which is received the hooked end 10, of a yoke or hanger 11, which projects forwardly of the frame and which also carries or supports an additional grooved wheel or pulley 12. The opposite end of the iron 8, is provided with a hole or perforation 13, in which is firmly secured or fastened one end of a strengthening chain or brace 14, the other end of which is fastened firmly or securely to some permanent support. It will thus be seen that the upper pulley 7, and the lower pulley 12, are arranged respectively at the upper and lower ends of the frame 1, on opposite sides thereof, and it will further be seen that from the manner of swinging or hanging these pulleys they will offer a firm resistance to any strain imposed upon them. The arrangement of the pulleys furthermore is such that the draft rope or chain 15, does not pass from one to the other in a truly vertical line, but at a slight inclination from a vertical line, and which as is well known in mechanical appliances generally greatly reduces the friction. The said draft rope or chain 15, is provided at its lower end forward of the frame 1, with a single tree 16, to which a horse may be attached for drawing upon the rope or chain to effect the raising of a load; and to the other end of such rope or chain 15, is fastened by means of a hook-connection 17, a scoop 18, which receives the material to be elevated or lowered. In connection with the scoop I employ an inclined chute 19, between the sides of which the scoop freely passes, and it is evident that the said scoop can be readily made to slide up or down with a load. When loads are being elevated, the use of a horse is generally required, but in unloading, the scoop may descend upon the chute with its load by gravity alone, and can be easily raised or elevated each time by hand.

In ordinary uses of my improved loading and unloading devices the frame must of course be fastened to some stable support, as for instance a beam, and I therefore bolt or otherwise secure to the lower or vertical portions of the side pieces 2, 2, duplicate pairs of clamping jaws or hooks 20, 21, the upper pair (20,) whereof being bent or turned downwardly at 22, to overlap the upper edge of a board or beam, while the lower ones 21, are bent or turned upwardly or reversely to the others so as to grip or embrace the lower edge of the same board or beam. By thus passing a board or beam lengthwise through the said hooks or clamps, and then properly securing or fastening the ends of said board or beam it is evident that a very firm and secure support will be had for the entire apparatus. The strengthening or bracing chain 14, hereinbefore referred to, is also fastened to some permanent support after being drawn taut, and as the resistance offered by the said chain is at right lines and in a reverse direction to the strain imposed upon the lower end of the frame 1, it is evident that a firm structure is obtained capable of handling very heavy loads.

In order that the frame may be secured to beams or boards of varying widths I preferably form slots 24, in the side pieces 2, 2, and through which slots the bolts of either the upper or lower clamps or hooks may be passed. In the drawings I have shown the fastening bolts 26, of the lower set of clamps passed through said slots, and it is evident that by loosening said bolts the clamps may be raised so as to be made to fit boards of different widths. After proper adjustment the said clamps may be again secured in place by screwing up the tightening nuts 27.

As above described it will be seen that my invention is adapted for use in almost any capacity for loading and unloading, but to indicate a specific embodiment I have shown in Fig. 5, its application to an ordinary sand or gravel wagon. In said Fig. 5, the construction and arrangement of parts is identical with that hereinbefore described, the only additional element employed being the crossbrace 30, between the sides of the wagon to strengthen such sides, the construction of said brace being clearly shown in Fig. 6.

As shown in Fig. 5, the frame 1, is secured to one of the removable side boards 31, of the wagon, and is permanently held by means of the clamping jaws 20, 21, in the manner already explained. The chute 19, is supported in any suitable manner against the opposite side of the wagon, and the scoop works therein while fastened to the lower end of the draft or elevating rope or chain 15, also as hereinbefore described. In this instance the brace or chain 14, is fastened to the pole 32, of the wagon, and the brace-rod 30, overlaps the sides of the wagon so as to strengthen and preserve the said sides in place. The said cross brace 30, will be seen to consist of a straight bar 33, of wood or other suitable material, having a covering 34, of iron the ends of which extend beyond the ends of the bar and are turned downwardly to form hooks 35, 35. It will thus be seen that when the brace rod is placed between the two sides of the wagon with the ends of the bar 33, bearing against the sides from within and the hooks 35, extending over the edge and resting on the outside, a very firm bracing will be had or effected.

Obviously as thus employed upon a wagon my invention possesses many advantages. The device is light yet very strong, and is not at all in the way. When the driver has reached the place of loading his wagon with sand, gravel, or other material, he has simply to unhitch the horse from the front of the wagon and attach it to the single tree on the end of the elevating rope 15, and then by successively filling the scoop and driving the horse forward the loading of the wagon will soon be accomplished. Instead of employing but a single horse two horses could be used in which event the single tree would be substituted by a double tree.

The form of wagon shown is ordinary, and it will be seen that my improved loading and unloading device can be readily attached thereto and again taken down. It will also be seen that my invention is adapted to a great many uses in loading and unloading different materials or substances, as coal, sand, gravel or grain, and the like. It is obvious also that many immaterial changes could be resorted to in the construction thereof.

Without limiting myself to the precise details of construction and arrangement shown and described, I claim—

1. In loading and unloading devices, a frame bent or inclined forwardly at its upper part, and provided with attaching clamps for fastening the frame to a support, an upper and a lower guide pulley, an elevating rope or chain and a scoop, and an inclined plane or chute, substantially as described.

2. In loading and unloading devices, a frame and adjustable clamps or jaws for securing the same to fixed supports of varying widths, an upper and lower guide pulley, an elevating rope or chain and a scoop, and an inclined plane or chute, substantially as described.

3. In loading and unloading devices, a frame bent or inclined forwardly at its upper part and straight at its lower part, adjustable clamps or jaws attached to said straight part and adapted to secure the frame to supports of varying width, an upper and lower guide pulley, an elevating rope or chain and a scoop, and an inclined plane or chute substantially as described.

4. In loading and unloading devices, a frame and adjustable clamps or jaws for securing the same to fixed supports of varying widths, an upper and lower guide pulley arranged respectively at the upper and lower ends of the frame on opposite sides thereof, an elevating rope or chain passing over said pulleys, and a scoop attached to said rope or chain, and an inclined plane or chute upon which the scoop works, substantially as described.

5. In loading and unloading devices, a frame slotted in its sides and duplicate pairs of clamps or jaws for fitting upon a fixed support, one pair of said jaws being adjustable in the slots, an upper and lower guide pulley, an elevating rope or chain and a scoop, a brace chain attached to the lower end of the frame, and an inclined plane or chute, substantially as described.

6. In loading and unloading devices, a frame and adjustable means for attachment to a fixed support, an upper pulley supported by said frame, a lower pulley removably supported by a hook connection at the lower end of said frame, a brace chain also attached to the lower end of the frame, an elevating rope or chain and a scoop, and an inclined plane or scoop, substantially as described.

7. In loading and unloading devices, the combination with a wagon or similar receptacle having removable side boards, and the brace-rod 30, fitting between said boards, of the frame 1, inclined forwardly at the top, and provided at its lower portion with adjustable clamps or jaws embracing one of the side boards of the wagon, upper and lower guide pulleys supported by the frame and an elevating rope or chain passing over said pulleys, a scoop and an inclined plane, substantially as described.

In testimony whereof I have signed my name to this specification in the presence of two subscribing witnesses.

EMANUEL FOURMAN.

Witnesses:
JACOB THOMAS,
KIRK HOFFMAN.